United States Patent
Hwang et al.

(10) Patent No.: US 8,345,786 B2
(45) Date of Patent: Jan. 1, 2013

(54) APPARATUS AND METHOD FOR TRANSMITTING/RECEIVING PREAMBLE SIGNAL AND ESTIMATING CHANNEL IN AN ORTHOGONAL FREQUENCY DIVISION MULTIPLEXING COMMUNICATION SYSTEMS USING MULTIPLE INPUT MULTIPLE OUTPUT SCHEME

(75) Inventors: Suk-Seung Hwang, Yongin-si (KR);
Sang-Boh Yun, Seongnam-si (KR);
Young-Hoon Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1394 days.

(21) Appl. No.: 12/001,264

(22) Filed: Dec. 11, 2007

(65) Prior Publication Data
US 2008/0137769 A1     Jun. 12, 2008

(30) Foreign Application Priority Data
Dec. 12, 2006   (KR) .................. 10-2006-0126675

(51) Int. Cl.
*H04B 7/02*   (2006.01)
(52) U.S. Cl. .................... 375/267; 375/260; 375/259
(58) Field of Classification Search .................. 375/267
See application file for complete search history.

(56) References Cited

U.S. PATENT DOCUMENTS

| | | | |
|---|---|---|---|
| 6,473,467 B1 * | 10/2002 | Wallace et al. .............. | 375/267 |
| 7,372,913 B2 * | 5/2008 | van Zelst et al. ............ | 375/267 |
| 7,532,563 B1 * | 5/2009 | Shirali et al. ................ | 370/205 |
| 7,583,746 B2 * | 9/2009 | Aoki et al. ................... | 375/267 |
| 7,606,316 B1 * | 10/2009 | Narasimhan ................. | 375/260 |
| 7,675,980 B2 * | 3/2010 | Aoki et al. ................... | 375/259 |
| 2002/0041635 A1 * | 4/2002 | Ma et al. ....................... | 375/267 |
| 2005/0047515 A1 * | 3/2005 | Walton et al. ................ | 375/267 |
| 2005/0084030 A1 * | 4/2005 | Zhou et al. ................... | 375/267 |
| 2005/0195734 A1 * | 9/2005 | Sandell et al. ................ | 370/208 |
| 2005/0276349 A1 * | 12/2005 | Egashira et al. .............. | 375/299 |
| 2006/0007850 A1 * | 1/2006 | Park et al. ..................... | 370/209 |
| 2006/0018394 A1 * | 1/2006 | van Zelst et al. ............. | 375/260 |
| 2006/0028976 A1 * | 2/2006 | Park et al. ..................... | 370/203 |
| 2006/0034385 A1 * | 2/2006 | Egashira et al. .............. | 375/267 |
| 2006/0056540 A1 * | 3/2006 | Magee .......................... | 375/299 |
| 2007/0206698 A1 * | 9/2007 | Yu et al. ........................ | 375/267 |
| 2008/0101496 A1 * | 5/2008 | Gaikwad ....................... | 375/267 |
| 2009/0268836 A1 * | 10/2009 | Zhao et al. .................... | 375/267 |

FOREIGN PATENT DOCUMENTS

| | | |
|---|---|---|
| KR | 1020050002207 A | 1/2005 |
| KR | 1020060035941 A | 4/2006 |

OTHER PUBLICATIONS

Office Action dated Sep. 29, 2009 in connection with Korean Patent Application No. 10-2006-0126675.

* cited by examiner

*Primary Examiner* — David Ometz
*Assistant Examiner* — Santiago Garcia

(57) ABSTRACT

A signal reception apparatus of an orthogonal frequency division multiplexing (OFDM) communication system using a multiple input, multiple output (MIMO) scheme. The signal reception apparatus, when it uses the $N_R$ receive antennas, receives a time-domain preamble signal transmitted by a signal transmission apparatus corresponding thereto via each of the $N_R$ receive antennas, and estimates a channel according to a channel estimation scheme using the time-domain preamble signal received via each of the $N_R$ receive antennas. When the signal transmission apparatus uses $N_T$ transmit antennas, the time-domain preamble signal is a signal transmitted by the signal transmission apparatus via each of the $N_T$ transmit antennas for a second time period which is set according to a corresponding transmit antenna within a first time period.

32 Claims, 6 Drawing Sheets

APPARATUS AND METHOD FOR TRANSMITTING/RECEIVING PREAMBLE SIGNAL AND ESTIMATING CHANNEL IN AN ORTHOGONAL FREQUENCY DIVISION MULTIPLEXING COMMUNICATION SYSTEMS USING MULTIPLE INPUT MULTIPLE OUTPUT SCHEME

CROSS-REFERENCE TO RELATED APPLICATION(S) AND CLAIM OF PRIORITY

This application claims the benefit under 35 U.S.C. §119 (a) of a Korean Patent Application filed in the Korean Intellectual Property Office on Dec. 12, 2006 and assigned Serial No. 2006-126675, the disclosure of which is incorporated herein by reference.

TECHNICAL FIELD OF THE INVENTION

The present invention relates to an apparatus and method for transmitting and receiving preamble signals and estimating channels in an orthogonal frequency division multiplexing (OFDM) communication system using a Multiple Input, Multiple Output (MIMO) scheme.

BACKGROUND OF THE INVENTION

In general, the next generation communication system has evolved to provide mobile stations with services capable of high-speed, high-capacity data transmission and reception. Therefore, the next generation communication system is developing into an orthogonal frequency division multiplexing communication system using a multiple input, multiple output scheme (i.e., a MIMO-OFDM communication system) to enable high-speed, high-capacity data transmission and reception.

In a MIMO-OFDM communication system, a signal transmission apparatus (e.g., a base station) exchanges signals with a signal reception apparatus (e.g., a mobile station) according to a frame structure. Therefore, the Base Station (BS) and the Mobile Station (MS) should acquire synchronization therebetween for the signal exchange according to the frame structure. For synchronization acquisition, the BS transmits a preamble signal so that the MS can detect a start of the frame transmitted by the BS. The MS receives the preamble signal transmitted by the BS, detects frame timing of the BS from the received preamble signal, and demodulates the frame received according to the detected frame timing. The preamble signal is used not only for the synchronization acquisition between the BS and the MS, but also for channel estimation between the BS and the MS.

In a MIMO-OFDM communication system, the schemes for generating a preamble signal can be roughly classified into a block-type scheme (or block-type preamble signal generation scheme) and a comb-type scheme (or comb-type preamble signal generation scheme). A description thereof will be given below.

Block-Type Scheme

A block-type scheme, also known as a pilot symbol scheme, refers to a scheme of generating a preamble signal using all subcarriers included in a corresponding OFDM symbol as a pilot tone, or pilot subcarrier, for a predetermined OFDM symbol period (e.g., M-OFDM symbol period).

Comb-Type Scheme

The comb-type scheme, also known as a pilot subcarrier scheme, refers to a scheme of generating a preamble signal using a predetermined number of subcarriers among the subcarriers included in each OFDM symbol, as a pilot tone.

A description will now be made of a channel estimation scheme for the MIMO-OFDM communication system that uses the block-type scheme as the preamble signal generation scheme.

Generally, the MIMO-OFDM communication system, when using the block-type scheme as the preamble signal generation scheme, uses a channel estimation scheme such as a Least Square (LS) scheme or a Minimum Mean-Square Error (MMSE) scheme. When the MIMO-OFDM communication system, using the block-type scheme as the preamble signal generation scheme, uses the MMSE scheme as the channel estimation scheme, the channel estimation performance is susceptible to noises, and the calculation complexity increases due to the auto-covariance matrix and cross covariance matrix calculations. In addition, when the MIMO-OFDM communication system uses the LS scheme as the channel estimation scheme, the system should use it along with a linear interpolation scheme because it should consider all channels between transmit antennas used in the BS and receive antennas used in the MS. In this case, the channel estimation performance may deteriorate due to the use of the linear interpolation scheme, and in particular, the channel estimation performance may considerably decrease with an increase in the number of transmit antennas and the number of receive antennas.

In addition, although the MIMO-OFDM communication system, using the block-type scheme as the preamble signal generation scheme, uses the MMSE scheme as the channel estimation scheme, the calculation complexity is very high, and the high calculation complexity may serve as overload of the channel estimation.

Therefore, there is a need for a channel estimation scheme for reducing the calculation complexity without the performance degradation in the MIMO-OFDM communication system using the block-type scheme as the preamble signal generation scheme.

SUMMARY OF THE INVENTION

To address the above-discussed deficiencies of the prior art, it is a primary object of the invention is to address at least the problems and/or disadvantages and to provide at least the advantages described below. Accordingly, an aspect of the invention provides an apparatus and method for transmitting and receiving a preamble signal in a MIMO-OFDM communication system.

Another aspect of the invention provides an apparatus and method for estimating a channel in a MIMO-OFDM communication system.

In one aspect of the invention, there is provided an apparatus for transmitting a preamble signal in a signal transmission apparatus of an orthogonal frequency division multiplexing (OFDM) communication system using a multiple input, multiple output (MIMO) scheme. The transmission apparatus includes $N_T$ transmission units which are connected to $N_T$ transmit antennas on a one-to-one basis when the signal transmission apparatus uses the $N_T$ transmit antennas. Each of the $N_T$ transmission units transmits a time-domain preamble signal for a second time period which is set according to a corresponding transmit antenna within a first time period.

According to another aspect of the invention, there is provided an apparatus for receiving a preamble signal in a signal reception apparatus of an orthogonal frequency division multiplexing (OFDM) communication system using a multiple input, multiple output (MIMO) scheme. The reception apparatus includes $N_R$ reception units connected to $N_R$ receive antennas on a one-to-one basis when the signal reception apparatus uses the $N_R$ receive antennas. Each of the $N_R$ reception units receives a time-domain preamble signal transmitted by a signal transmission apparatus corresponding to the signal reception apparatus via the corresponding receive antenna. When the signal transmission apparatus uses $N_T$ transmit antennas, the time-domain preamble signal is a signal transmitted by the signal transmission apparatus via each of the $N_T$ transmit antennas for a second time period which is set according to a corresponding transmit antenna within a first time period.

In one aspect of the invention, there is provided an apparatus for estimating a channel in a signal reception apparatus of an orthogonal frequency division multiplexing (OFDM) communication system using a multiple input, multiple output (MIMO) scheme. The channel estimation apparatus includes $N_R$ reception units connected to $N_R$ receive antennas on a one-to-one basis when the signal reception apparatus uses the $N_R$ receive antennas. Each of the $N_R$ reception units receives a time-domain preamble signal transmitted by a signal transmission apparatus corresponding to the signal reception apparatus via the corresponding receive antenna. A channel estimation unit for estimating a channel according to a channel estimation scheme using a time-domain preamble signal received via each of the $N_R$ receive antennas. When the signal transmission apparatus uses $N_T$ transmit antennas, the time-domain preamble signal is a signal transmitted by the signal transmission apparatus via each of the $N_T$ transmit antennas for a second time period which is set according to a corresponding transmit antenna within a first time period.

In another aspect of the invention, there is provided a method for transmitting a preamble signal in a signal transmission apparatus of an orthogonal frequency division multiplexing (OFDM) communication system using a multiple input, multiple output (MIMO) scheme. The transmission method includes, when the signal transmission apparatus uses $N_T$ transmit antennas, transmitting a time-domain preamble signal via each of the $N_T$ transmit antennas for a second time period which is set according to a corresponding transmit antenna within a first time period.

In one aspect of the invention, there is provided a method for receiving a preamble signal in a signal reception apparatus of an orthogonal frequency division multiplexing (OFDM) communication system using a multiple input, multiple output (MIMO) scheme. The reception method includes, when the signal reception apparatus uses $N_R$ receive antennas, receiving a time-domain preamble signal transmitted by a signal transmission apparatus corresponding to the signal reception apparatus via each of the $N_R$ receive antennas. When the signal transmission apparatus uses $N_T$ transmit antennas, the time-domain preamble signal is a signal transmitted by the signal transmission apparatus via each of the $N_T$ transmit antennas for a second time period which is set according to a corresponding transmit antenna within a first time period.

According to another aspect of the invention, a method is provided for estimating a channel in a signal reception apparatus of an orthogonal frequency division multiplexing (OFDM) communication system using a multiple input, multiple output (MIMO) scheme. The channel estimation method includes, when the signal reception apparatus uses $N_R$ receive antennas, receiving a time-domain preamble signal transmitted by an signal transmission apparatus corresponding to the signal reception apparatus via each of the $N_R$ receive antennas and estimating a channel according to a channel estimation scheme using a time-domain preamble signal received via each of the $N_R$ receive antennas. When the signal transmission apparatus uses $N_T$ transmit antennas, the time-domain preamble signal is a signal transmitted by the signal transmission apparatus via each of the $N_T$ transmit antennas for a second time period which is set according to a corresponding transmit antenna within a first time period.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication systems.

Preferred embodiments of the present invention will now be described in detail with reference to the annexed drawings. In the following description, a detailed description of known functions and configurations incorporated herein has been omitted for clarity and conciseness.

The present invention provides an apparatus and method for transmitting and receiving preamble signals and estimating channels in an Orthogonal Frequency Division Multiplexing (OFDM) communication system using a Multiple Input, Multiple Output (MIMO) scheme (hereinafter, a MIMO-OFDM communication system). In particular, the present invention provides a preamble signal transmission and reception apparatus and method suitable for the MIMO-OFDM communication system that uses an adaptive algorithm, for example, a Least Mean Square (LMS) scheme, as a channel estimation scheme, and also provides a channel estimation apparatus and method associated with the proposed preamble signal transmission and reception apparatus and method.

Figure 1:
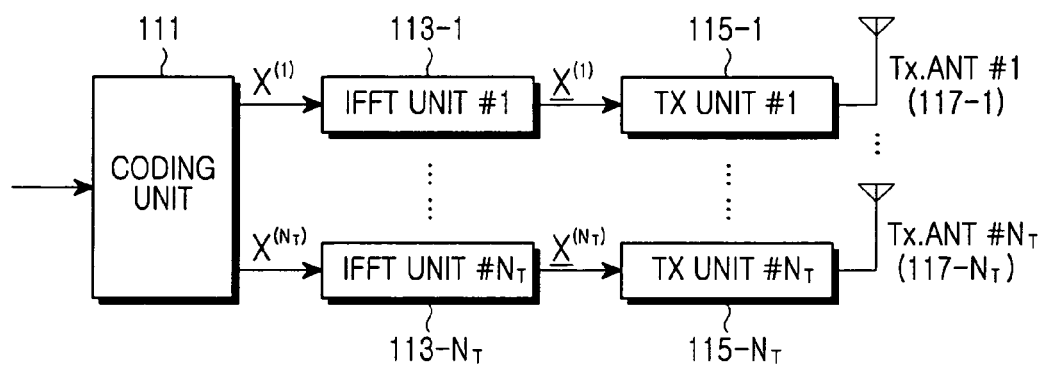
FIG. 1 illustrates an internal structure of a signal transmission apparatus in a MIMO-OFDM communication system according to an embodiment of the present invention.

FIG. 1 illustrates an internal structure of a signal transmission apparatus in a MIMO-OFDM communication system according to an embodiment of the present invention.

Referring to FIG. 1, the signal transmission apparatus includes a coding unit 111, a plurality of, for example, $N_T$ Inverse Fast Fourier Transform (IFFT) units of an IFFT unit #1 113-1 to an IFFT unit #$N_T$ 113-$N_T$, $N_T$ transmission units of a transmission unit #1 115-1 to a transmission unit #$N_T$ 115-$N_T$, and $N_T$ transmit antennas Tx.ANT of a transmit antenna #1 117-1 to a transmit antenna #$N_T$ 117-$N_T$.

Upon receiving an input signal, the coding unit 111 codes the input signal with a predetermined coding scheme, for example, Space Time Block Coding (STBC) scheme, and outputs the corresponding signals to the corresponding IFFT units. It is assumed herein that the coding unit 111 outputs $X^{(1)}$ to the IFFT unit #1 113-1 and outputs $X^{(N_T)}$ to the IFFT unit #$N_T$ 113-$N_T$. Herein, $X^{(n)}$ (where n=1, 2, ..., $N_T$) denotes a frequency-domain preamble signal mapped to a transmit antenna #n. That is, the $X^{(1)}$ indicates a frequency-domain preamble signal mapped to the transmit antenna #1 117-1, and the $X^{(N_T)}$ indicates a frequency-domain preamble signal mapped to the transmit antenna #$N_T$ 117-$N_T$. In addition, the $X^{(n)}$ will be assumed to be a frequency-domain preamble signal for the case where the block-type scheme is used as the preamble signal generation scheme. The block-type scheme, also known as a pilot symbol scheme, refers to a scheme of generating a preamble signal using all subcarriers included in a corresponding OFDM symbol as a pilot tone, or pilot subcarrier, for a predetermined OFDM symbol period (e.g., M-OFDM symbol period).

The IFFT unit #1 113-1 to the IFFT unit #$N_T$ 113-$N_T$ each perform IFFT calculation on the signals output from the coding unit 111, and output the corresponding signals to the corresponding transmission units. That is, it is assumed that the IFFT unit #1 113-1 outputs $\underline{X}^{(1)}$ to the transmission unit #1 115-1, and the IFFT unit #$N_T$ 113-$N_T$ outputs $\underline{X}^{(N_T)}$ to the transmission unit #$N_T$ 115-$N_T$. Herein, $\underline{X}^{(n)}$ (where n=1, 2, ..., $N_T$) denotes a time-domain preamble signal mapped to a transmit antenna #n. That is, the $\underline{X}^{(1)}$ indicates a time-domain preamble signal mapped to the transmit antenna #1 117-1, and the $\underline{X}^{(N_T)}$ indicates a time-domain preamble signal mapped to the transmit antenna #$N_T$ 117-$N_T$. The time-domain preamble signal has a format capable of enabling a signal reception apparatus associated with the signal transmission apparatus to use the LMS scheme as the channel estimation scheme, and a detailed description thereof will be given below.

The transmission unit #1 115-1 to the transmission unit #$N_T$ 115-$N_T$ each perform transmission processing on the signals output from the corresponding IFFT units, and output the transmission-processed signals to the signal reception apparatus via the corresponding transmit antennas. That is, the transmission unit #1 115-1 performs transmission processing on the signal output from the IFFT unit #1 113-1, and outputs the transmission-processed signal via the transmit antenna #1 117-1, and the transmission unit #$N_T$ 115-$N_T$ performs transmission processing on the signal output from the IFFT unit #$N_T$ 113-$N_T$, and outputs the transmission-processed signal via the transmit antenna #$N_T$ 117-$N_T$. The transmission processing operation includes a guard interval signal insertion operation and a Radio Frequency (RF) processing operation, and a detailed description thereof will be omitted herein because the operations are not directly related to the present invention.

Next, with reference to FIG. 2, a description will be made of an internal structure of a signal reception apparatus in a MIMO-OFDM communication system according to an embodiment of the present invention.

Figure 2:
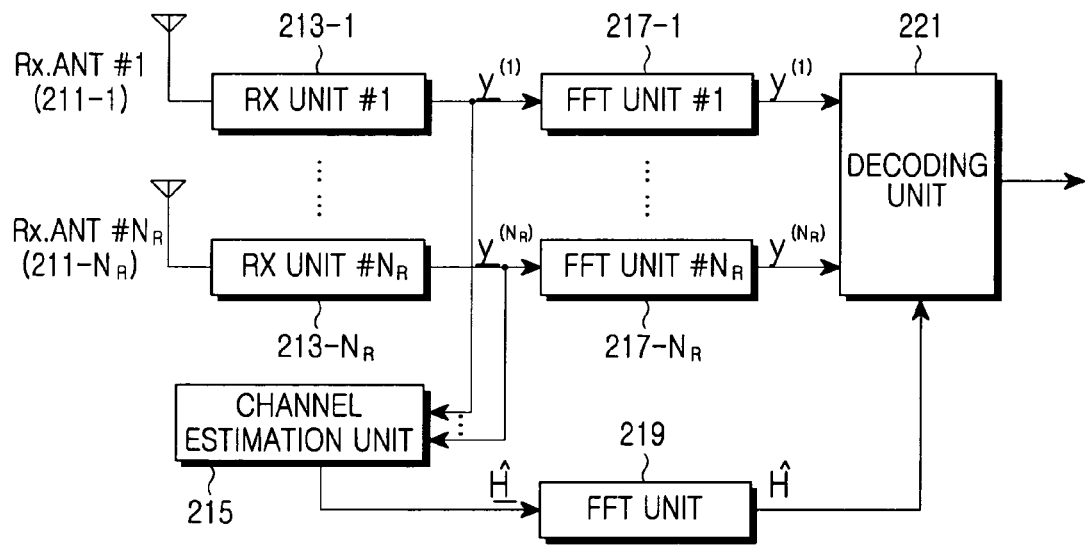
FIG. 2 illustrates an internal structure of a signal reception apparatus in a MIMO-OFDM communication system according to an embodiment of the present invention.

FIG. 2 illustrates an internal structure of a signal reception apparatus in a MIMO-OFDM communication system according to an embodiment of the present invention.

Referring to FIG. 2, the signal reception apparatus includes a plurality of, for example, $N_R$ receive antennas of a receive antenna #1 211-1 to a receive antenna #$N_R$ 211-$N_R$, $N_R$ reception units of a reception unit #1 213-1 to a reception unit #$N_R$ 213-$N_R$, a channel estimation unit 215, $N_R$ Fast Fourier Transform (FFT) units or an FFT unit #1 217-1 to an FFT unit #$N_R$ 217-$N_R$, an FFT unit 219, and a decoding unit 221.

The signals received via the receive antenna #1 211-1 to the receive antenna #$N_R$ 211-$N_R$ are delivered to the corresponding reception units. That is, the signal received via the receive antenna #1 211-1 is delivered to the reception unit #1 213-1, and the signal received via the receive antenna #$N_R$ 211-$N_R$ is delivered to the reception unit #$N_R$ 213-$N_R$. The reception unit #1 213-1 to the reception unit #$N_R$ 213-$N_R$ each perform reception processing on the signals provided from the corresponding receive antennas, and output the reception-processed signals to the channel estimation unit 215 and the corresponding FFT units. That is, the reception unit #1 213-1 performs reception processing on the signal provided from the receive antenna #1 211-1, and outputs the reception-processed signal to the channel estimation unit 215 and the FFT unit #1 217-1, and the reception unit #$N_R$ 213-$N_R$ performs reception processing on the signal provided from the receive antenna #$N_R$ 211-$N_R$, and outputs the reception-processed signal to the channel estimation unit 215 and the FFT unit #$N_R$ 217-$N_R$.

It will be assumed herein that the reception unit #1 213-1 outputs $\underline{y}^{(1)}$ to the channel estimation unit 215 and the FFT unit #1 217-1, and the reception unit #$N_R$ 213-$N_R$ outputs $\underline{y}^{(N_R)}$ to the channel estimation unit 215 and the FFT unit #$N_R$ 217-$N_R$. Herein, $\underline{y}^{(j)}$ (where j=1, 2, ..., $N_R$) denotes a time-domain signal received via a receive antenna #j. That is, the $\underline{y}^{(1)}$ indicates a time-domain signal received via the receive antenna #1 211-1, and the $\underline{y}^{(N_R)}$ indicates a time-domain signal received via the receive antenna #$N_R$ 211-$N_R$. In addition, the reception processing operation includes an RF processing operation and a guard interval signal removal operation, and a detailed description thereof will be omitted herein because the operations are not directly related to the present invention.

The channel estimation unit 215 estimates the time-domain channel between the signal transmission apparatus and the signal reception apparatus using the signals output from the reception unit #1 213-1 to the reception unit #$N_R$ 213-$N_R$, and outputs the estimated time-domain channel matrix $\hat{\underline{H}}$ to the FFT unit 219. The channel estimation unit 215 estimates the channel using the LMS scheme, and a detailed description thereof will be given below.

The FFT unit #1 217-1 to the FFT unit #$N_R$ 217-$N_R$ each perform FFT calculation on the signals output from the corresponding reception units, and output the corresponding signals to the decoding unit 221. That is, the FFT unit #1 217-1 performs FFT calculation on the signal output from the reception unit #1 213-1, and outputs the corresponding signal to the decoding unit 221, and the FFT unit #$N_R$ 217-$N_R$ performs FFT calculation on the signal output from the reception unit #$N_R$ 213-$N_R$, and outputs the corresponding signal to the decoding unit 221. Herein, the signal output from the FFT unit #1 217-1 is assumed to be $y^{(1)}$, and the signal output from the FFT unit #$N_R$ 217-$N_R$ is assumed to be $y^{(N_R)}$.

The FFT unit 219 performs FFT calculation on the estimated time-domain channel matrix $\hat{H}$ output from the channel estimation unit 215, and outputs the corresponding signal to the decoding unit 221. Herein, the signal output from the FFT unit 219 is an estimated frequency-domain channel matrix $\hat{H}$. The decoding unit 221 restores the estimated frequency-domain channel matrix $\hat{H}$ to the original preamble signal transmitted by the signal transmission apparatus using the signals output from the FFT unit #1 217-1 to the FFT unit #$N_R$ 217-$N_R$.

A detailed description will now be made of an operation in which the channel estimation unit 215 estimates a channel using the LMS scheme.

The signal output from the channel estimation unit 215, or the estimated time-domain channel signal, can be expressed as Equation 1:

$$\underline{u}^{(n,j)}(k)=\hat{\underline{h}}^{(n,j)H}(k)\underline{x}^{(n)}(k). \qquad [\text{Eqn. 1}]$$

In Equation 1, $\hat{h}^{(n,j)}(k)=[\hat{h}_L^{(n,j)}(k), \ldots, \hat{h}_1^{(n,j)}(k)]^T$ denotes an $(n,j)^{th}$ estimated tap vector, H denotes Hermitian calculation, L denotes the number of taps, and k denotes a time index. It should be noted herein that because the signal after passing through the channel has a convolution form of the transmission signal and the channel, the tap vectors are expressed in order of L to 1 (i.e., in reverse order). An equation for adapting the $\hat{h}^{(n,j)}(k)$ can be expressed as Equation 2:

$$\hat{\underline{h}}^{(n,j)}(k+1)=\hat{\underline{h}}^{(n,j)}(k)+2\mu\underline{x}^{(n)}(k)\underline{e}^{(n,j)*}(k). \qquad \{\text{Eqn. 2}\}$$

In Equation 2, $\mu$ denotes a step-size parameter for controlling a convergence speed of the equation for adapting $\hat{h}^{(n,j)}(k)$ (i.e., Equation 2), and * denotes complex conjugation. In Equation 2, an estimated time-domain error signal $\underline{e}^{(n,j)}(k)$ can be expressed as Equation 3:

$$\underline{e}^{(n,j)}(k)=\underline{y}^{(j)}(k)-\underline{u}^{(n,j)}(k) \qquad [\text{Eqn. 3}]$$

When the number L of taps is unknown, a scheme of estimating the number of taps is used, or the tap vectors, the number of which is expected to be sufficiently greater than the number L of taps, are used. When the tap vectors, the number of which is expected to be sufficiently greater than the number L of taps, are used, the taps having a noticeably smaller absolute value compared to the other values after undergoing channel estimation can be ignored.

An output value for a $j^{th}$ receive antenna used in Equation 3 (i.e., an output value $y^{(j)}(k)$ at the $j^{th}$ reception unit) can be expressed as Equation 4:

$$\underline{y}^{(j)}(k) = \underline{h}^{(n,j)H}\underline{x}^{(n)}(k) + \sum_{i=1,i\neq n}^{N_T} \underline{h}^{(i,j)H}\underline{x}^{(i)}(k) + \underline{v}^{(n,j)}(k) \qquad [\text{Eqn. 4}]$$

-continued
$$\underline{h}^{(n,j)} = [\underline{h}_L^{(n,j)}, \ldots, \underline{h}_1^{(n,j)}]^T.$$

In Equation 4, $h^{(n,j)}=[\underline{h}_L^{(n,j)}, \ldots, \underline{h}_1^{(n,j)}]^T$ denotes vectors including $(n,j)^{th}$ channel taps, and it is assumed herein that the channel remains unchanged within one OFDM symbol. In Equation 4, $\underline{v}^{(n,j)}(k)$ denotes noises for the $(n,j)^{th}$ channel.

Further, as shown in Equation 4, $$\sum_{i=1,i\neq n}^{N_T} \underline{h}^{(i,j)H}\underline{x}^{(i)}(k)$$

serves as an interference signal when an $(n,j)^{th}$ channel $h^{(n,j)}$ is estimated. Therefore, when the preamble signal having the general structure used in the MIMO-OFDM communication system is used, it is difficult to estimate a channel using the LMS scheme. Accordingly, the present invention proposes a new preamble structure to enable the channel estimation unit to estimate a channel using the LMS scheme, and a description thereof will be made with reference to FIGS. 3 and 4.

Figure 3:
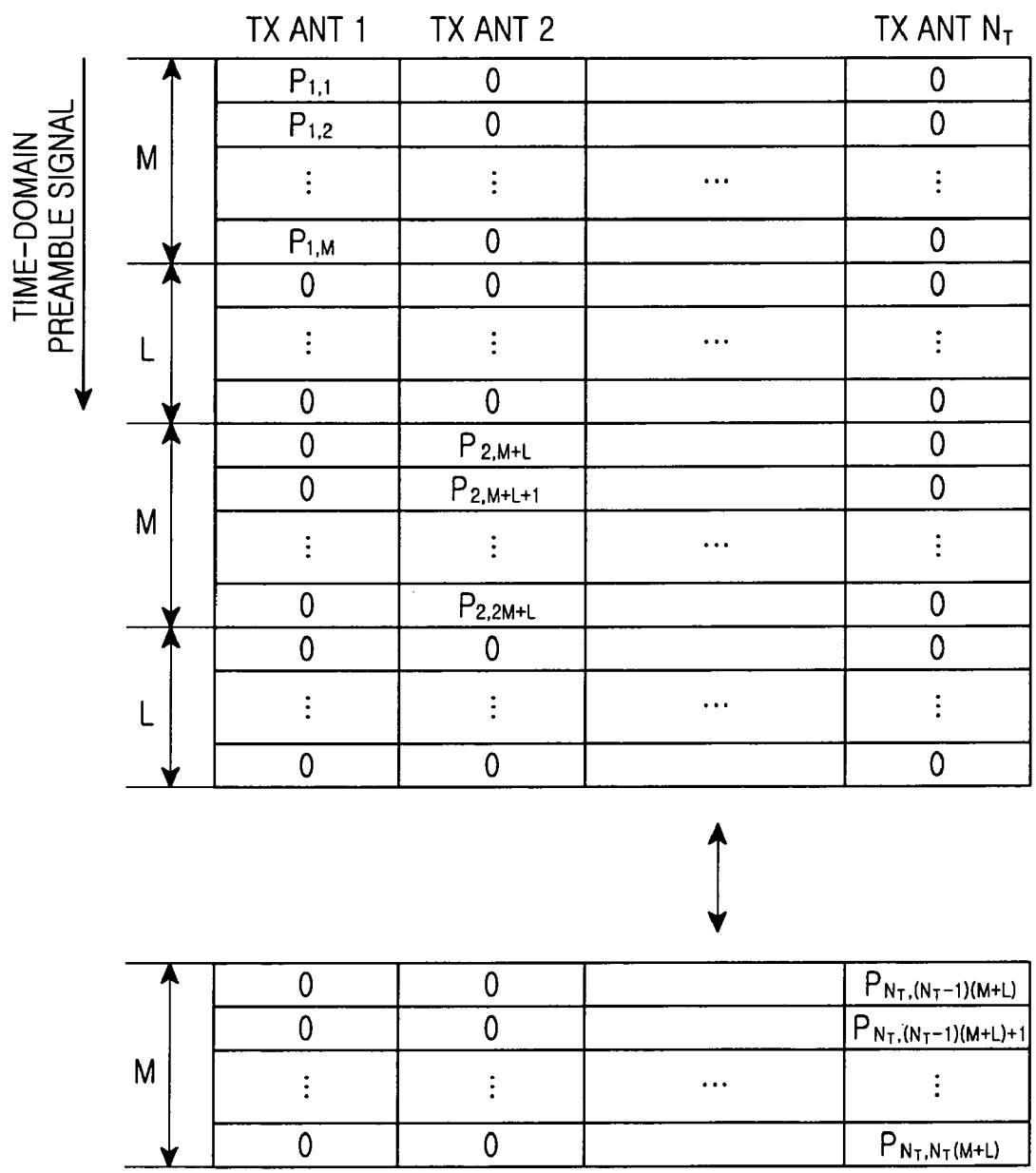
FIG. 3 illustrates a time-domain preamble signal structure according to an embodiment of the present invention.

FIG. 3 illustrates a time-domain preamble signal structure according to an embodiment of the present invention.

Before a description of FIG. 3 is given, it is assumed herein that the block-type scheme is used as the preamble signal generation scheme. The time-domain preamble signal shown in FIG. 3 is a preamble signal after undergoing IFFT calculation, M indicates the number of time-domain data (i.e., the number of data samples) used when a channel impulse response is detected using the LMS scheme, and L indicates a length of the channel impulse response (i.e., the number of taps). That is, if 500 time-domain data (i.e., pilot data) are used to perform channel estimation for each transmit antenna using the LMS scheme, M is 500 (M=500). In addition, the length of the preamble signal transmitted via each transmit antenna is equal to the number of IFFT/FFT points. That is, if the number of IFFT/FFT points is denoted by N, N=$N_T$(M+L).

As shown in FIG. 3, when $(n,j)^{th}$ channel taps are estimated, only the input values to the $(n,j)^{th}$ channel have a non-zero value and the input values to other channels have a value of '0', so the $(n,j)^{th}$ channel is never affected by other channels during channel estimation. Even though the MIMO-OFDM communication system generates and transmits a preamble signal using the block-type scheme, when it uses the time-domain preamble signal having the structure shown in FIG. 3, there is no need to use the linear interpolation scheme generally used in the MIMO-OFDM communication system to cancel the interference from other channels. Therefore, the error generated due to the use of the linear interpolation scheme can also be prevented, contributing to improvement of the channel estimation performance.

Next, with reference to FIG. 4, a description will be made of a time-domain preamble signal structure and a frequency-domain preamble signal structure mapped to an $n^{th}$ transmit antenna.

Figure 4:
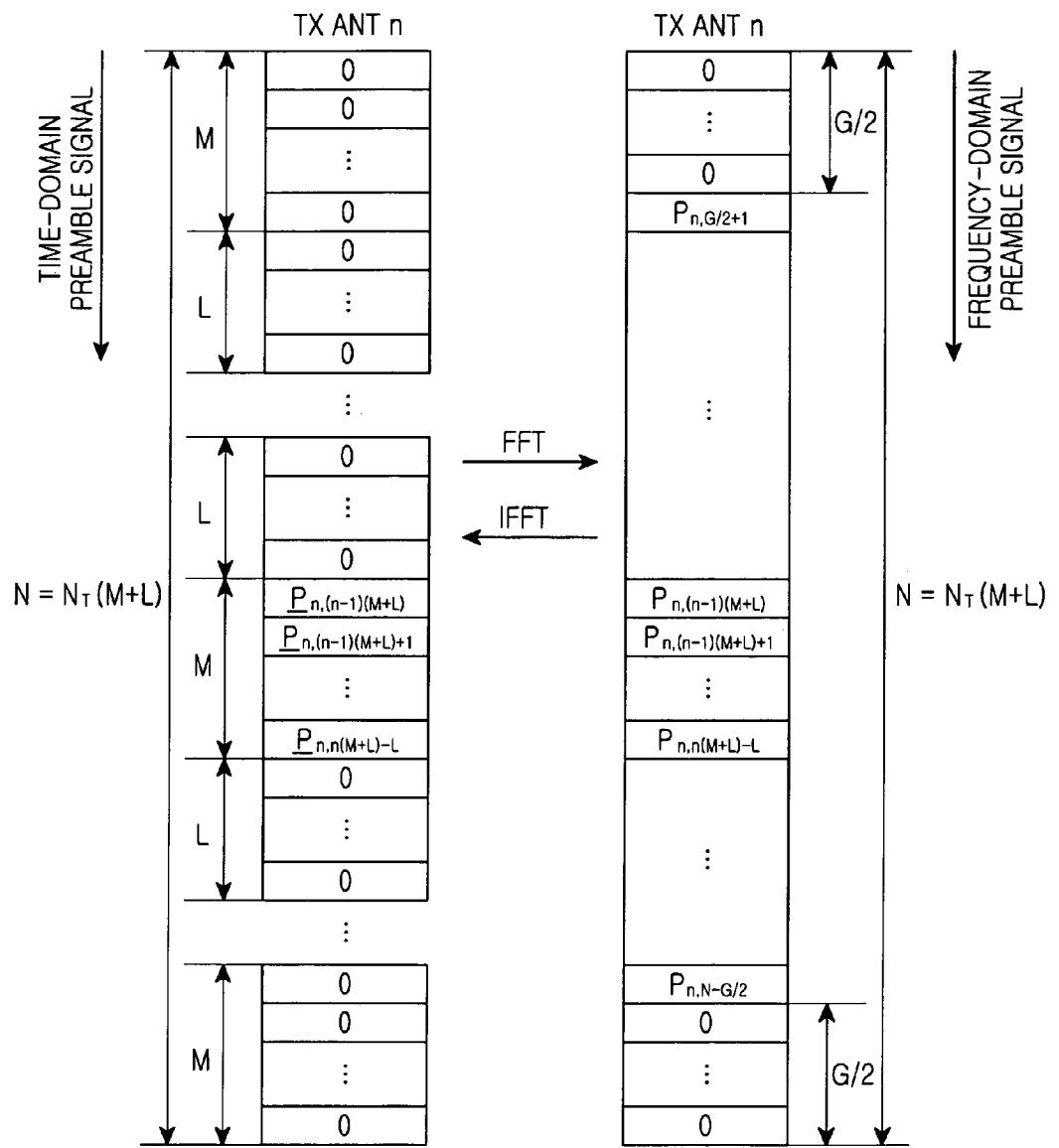
FIG. 4 illustrates a time-domain preamble signal structure and a frequency-domain preamble signal structure mapped to an nth transmit antenna according to an embodiment of the present invention.

FIG. 4 illustrates a time-domain preamble signal structure and a frequency-domain preamble signal structure mapped to an $n^{th}$ transmit antenna according to an embodiment of the present invention.

Referring to FIG. 4, a time-domain preamble signal mapped to an $n^{th}$ transmit antenna, after undergoing FFT calculation, becomes a frequency-domain preamble signal mapped to the $n^{th}$ transmit antenna. In reverse, a frequency-domain preamble signal mapped to an $n^{th}$ transmit antenna, after undergoing IFFT calculation, becomes a time-domain preamble signal mapped to the $n^{th}$ transmit antenna. It can be appreciated in FIG. 4 that the frequency-domain preamble signal is a preamble signal generated according to the block-type scheme.

In particular, as shown in FIG. 4, the frequency-domain preamble signal mapped to the $n^{th}$ transmit antenna is generated considering even the Guard Band (GB). That is, the frequency-domain preamble signal includes a guard band subcarrier signal. The frequency-domain preamble signal mapped to the $n^{th}$ transmit antenna can be expressed as Equation 5:

$$P_n = \begin{bmatrix} P_{n,G/2} \\ P_{n,P} \\ P_{n,G/2} \end{bmatrix}. \quad \text{[Eqn. 5]}$$

In Equation 5, G denotes a length of the guard band, and P is N−G (P=N−G). Further, in Equation (5), $P_{n,G/2}=0_{G/2}$ denotes a zero (0) vector having a size of G/2, and $P_{n,P}$ denotes a P×1 pilot subcarrier vector. That is, as shown in FIG. 4, the frequency-domain preamble signal mapped to an $n^{th}$ transmit antenna is generated such that 0 is transmitted over G subcarriers among a total of N subcarriers.

The frequency-domain preamble signal shown in Equation (5), after undergoing FFT calculation, becomes a time-domain preamble signal shown in Equation 6:

$$\underline{P}_n = F_{N \times N}^H P_n = [F_1 F_P F_2] \begin{bmatrix} P_{n,G/2} \\ P_{n,P} \\ P_{n,G/2} \end{bmatrix} = \quad \text{[Eqn. 6]}$$

$$F_1 P_{n,G/2} + F_P P_{n,P} + F_2 P_{n,G/2} = F_P P_{n,P}.$$

In Equation 6, $F_{N \times N}^H$ denotes an N×N IFFT matrix, $F_1 = F_{N \times N}^H(:,1:G/2)$, $F_2 = F_{N \times N}^H(:,N-G/2+1:N)$, and $F_P = F_{N \times N}^H(:,G/2+1:N-G/2)$. Herein, ":" denotes all columns or rows in an arbitrary matrix, and "l:r" denotes an $l^{th}$ column or row to an $r^{th}$ column or row.

Further, in Equation 6, the pilot subcarrier vector can be expressed as Equation 7:

$$P_{n,P} = (F_P^H F_P)^{-1} F_P^H \underline{P}_n. \quad \text{[Eqn. 7]}$$

The elements included in the IFFT matrix have the characteristic defined in Equation 8:

$$\frac{1}{N} \sum_{i=0}^{N-1} e^{(j2\pi/N)(k-l)i} = \begin{Bmatrix} 1 & \text{for } k-l = rN, r = \text{integer} \\ 0 & \text{otherwise} \end{Bmatrix}. \quad \text{[Eqn. 8]}$$

According to the characteristic of the IFFT matrix shown in Equation 8, the relationship of $F_P^H F_P = I_{P \times P}$ is given in Equation 7. Therefore, Equation 7 can be simplified as Equation 9. Herein, $I_{P \times P}$ indicates a P×P identity matrix:

$$P_{n,P} = F_P^H \underline{P}_n. \quad \text{[Eqn. 9]}$$

As a result, the frequency-domain preamble signal including a guard band can be expressed as Equation 10.

$$P_n = \begin{bmatrix} 0_{G/2} \\ F_P^H \underline{P}_n \\ 0_{G/2} \end{bmatrix}. \quad \text{[Eqn. 10]}$$

In Equation 10, $0_{G/2}$ denotes a (G/2)×1 zero (0) matrix.

Actually, the time-domain preamble signal used as an input value to the channel estimation unit 215 can be expressed as Equation 11:

$$\underline{P}_n = F_{N \times N} P_n. \quad \text{[Eqn. 11]}$$

Next, with reference to FIGS. 5A and 5B, a description will now be made of a magnitude of a time-domain preamble signal according to an embodiment of the present invention.

Figure 5A:
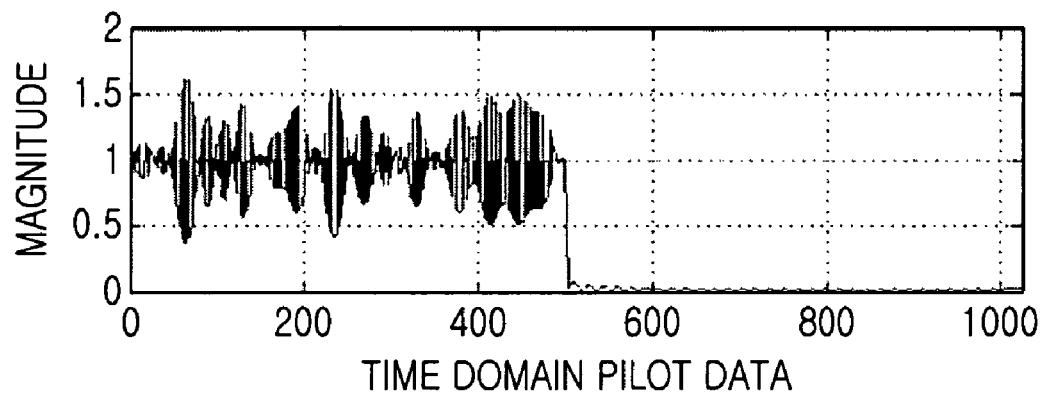
FIGS. 5A and 5B illustrate a magnitude of a time-domain preamble signal according to an embodiment of the present invention.
Figure 5B:
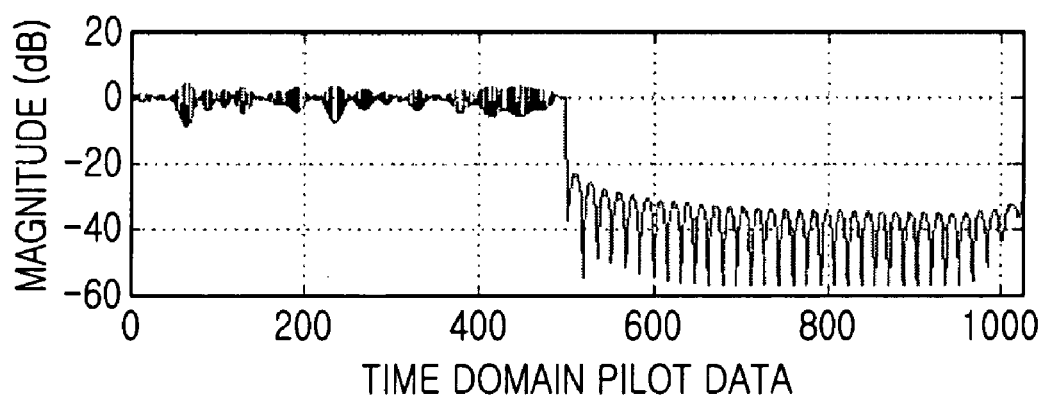

FIGS. 5A and 5B illustrate a magnitude of a time-domain preamble signal according to an embodiment of the present invention.

Shown in FIG. 5A is a graph showing a magnitude of a time-domain preamble signal in the form of an absolute value, and shown in FIG. 5B is a graph showing a magnitude of a time-domain preamble signal in the form of an absolute value in [dB]. As shown in FIGS. 5A and 5B, when the frequency-domain preamble signal includes a guard band, an error occurring due to the guard band is below −30 [dB] on average, generally having a value lower than the power of the noises. Therefore, it can be assumed that there is almost no performance reduction for the preamble signal, which may occur due to the guard band.

Next, with reference to FIG. 6, a description will be made of a comparison between channel estimation performance of the proposed LMS scheme and channel estimation performance of the general linear interpolation scheme.

Figure 6:
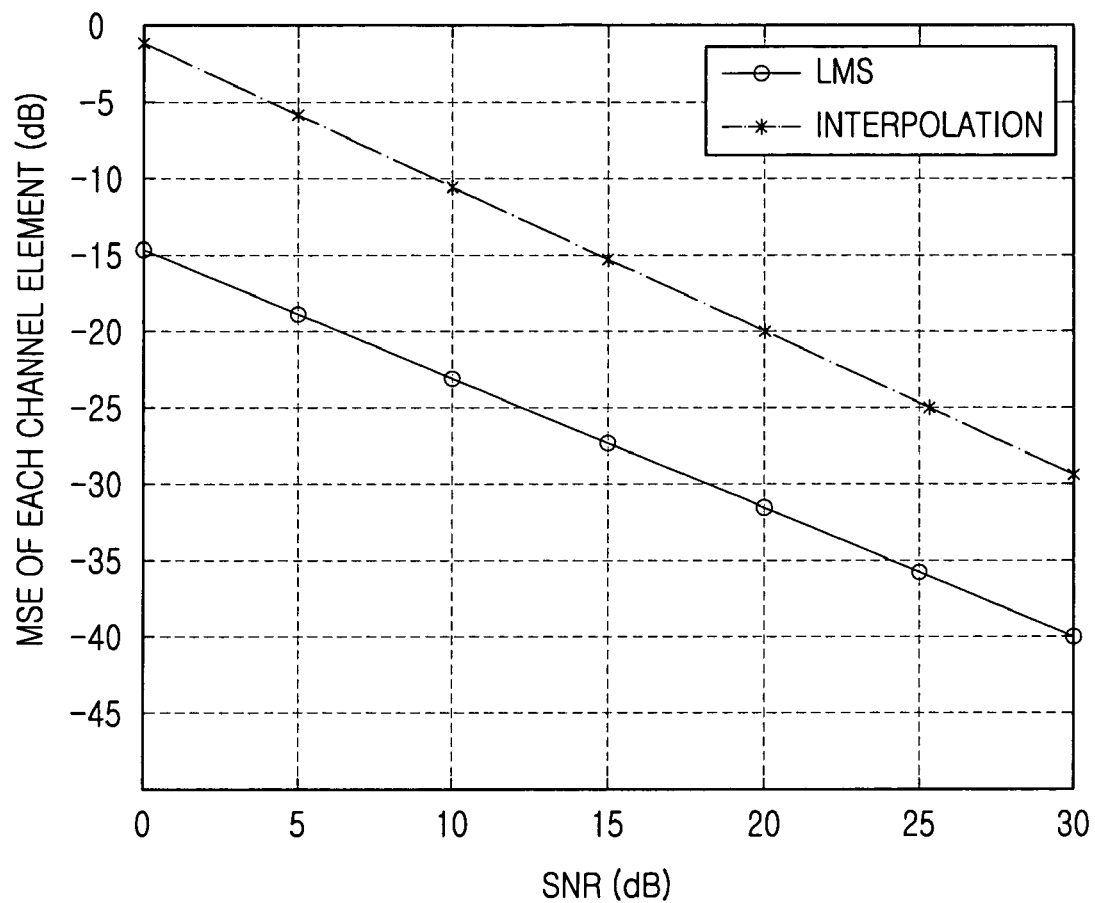
FIG. 6 illustrates a comparison between channel estimation performance of the proposed LMS scheme and channel estimation performance of the general linear interpolation scheme.

FIG. 6 illustrates a comparison between channel estimation performance of the proposed LMS scheme and channel estimation performance of the general linear interpolation scheme.

Referring to FIG. 6, the vertical axis indicates a Mean Square Error (MSE) of each channel element, and the horizontal axis indicates a Signal-to-Noise Ratio (SNR). In the graph shown in FIG. 6, the curve denoted by 'LMS' indicates the channel estimation performance for the case where the LMS scheme proposed by the present invention is used, and the curve denoted by 'Interpolation' indicates the channel estimation performance for the case where the linear interpolation scheme is used.

The channel estimation performance graph shown in FIG. 6 was acquired on the assumption of the following environments:

1) Number of Transmit Antennas/Receive Antennas—The signal transmission apparatus uses 2 transmit antennas, and the signal reception apparatus uses 2 receive antennas;

2) Channel Environment—The i.i.d 12-tap Exponential Decaying Finite Impulse Response (FIR) channel environment is assumed;

3) Number of FFT/IFFT points—1024 FFT/IFFT points are assumed; and

4) Preamble Structure.

When the LMS scheme is used as the channel estimation scheme, the time-domain preamble signal having the structure described in FIG. 3 is used, and when the linear interpolation scheme is used as the channel estimation scheme, the preamble signal having the structure generated by the block-type scheme generally used in the MIMO-OFDM communication system is used.

It can be appreciated from FIG. 6 that the LMS scheme proposed by the present invention is superior to the linear interpolation scheme in terms of the channel estimation performance. That is, the channel estimation performances for the cases where the LMS scheme is used and the linear interpolation scheme is used, show an MSE performance difference of 10 [dB] or higher.

Next, with reference to FIG. 7, a description will be made of a time-domain preamble signal structure and a frequency-domain preamble signal structure mapped to an $n^{th}$ transmit antenna.

Figure 7:
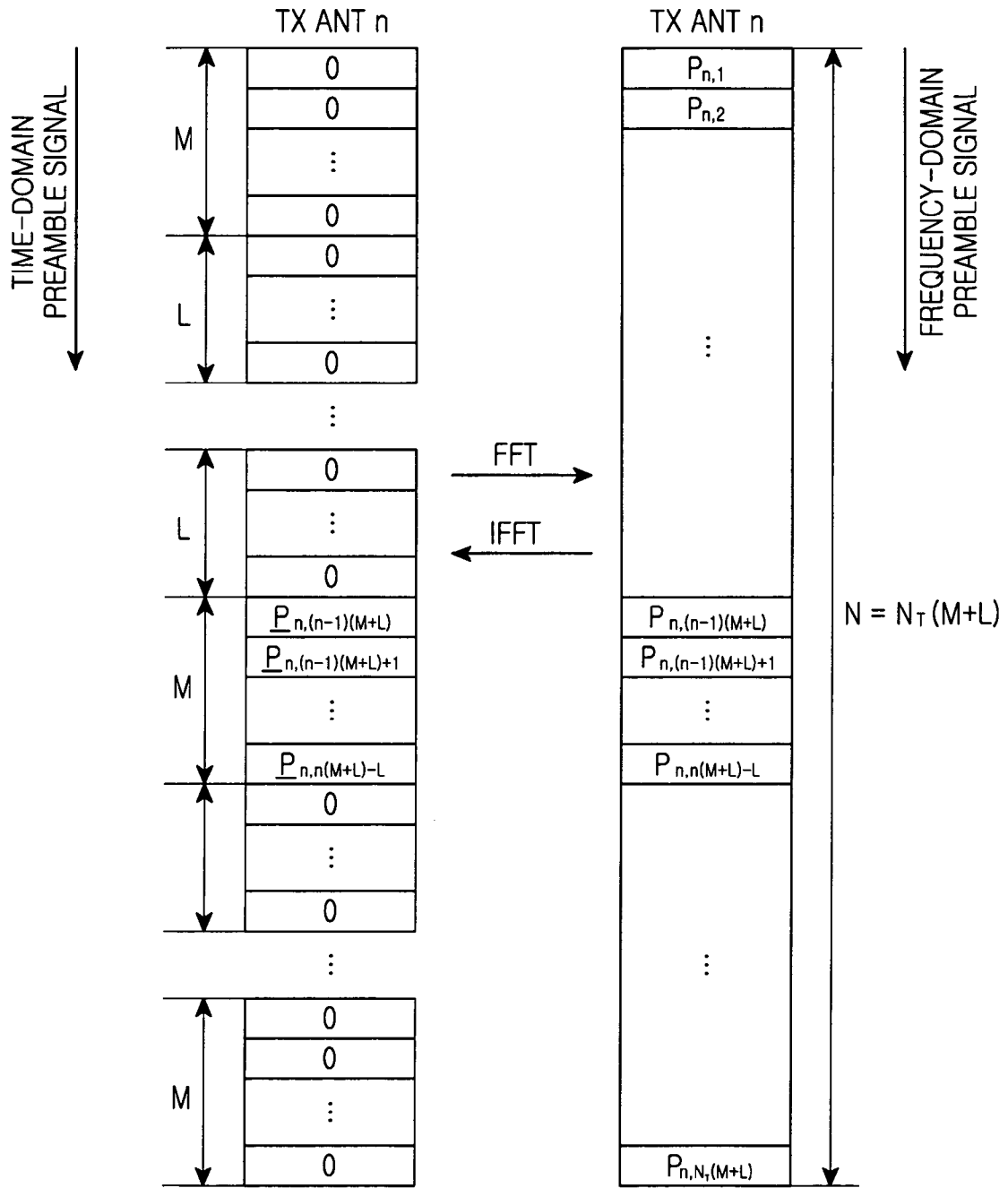
FIG. 7 illustrates a time-domain preamble signal structure and a frequency-domain preamble signal structure mapped to an nth transmit antenna according to an embodiment of the present invention.

FIG. 7 illustrates a time-domain preamble signal structure and a frequency-domain preamble signal structure mapped to an $n^{th}$ transmit antenna according to an embodiment of the present invention.

Referring to FIG. 7, the time-domain preamble signal mapped to an $n^{th}$ transmit antenna, after undergoing FFT calculation, becomes a frequency-domain preamble signal mapped to the $n^{th}$ transmit antenna. In reverse, the frequency-domain preamble signal mapped to an $n^{th}$ transmit antenna, after undergoing IFFT calculation, becomes a time-domain preamble signal mapped to the $n^{th}$ transmit antenna. It can be appreciated in FIG. 7 that the frequency-domain preamble signal is a preamble signal generated according to the block-type scheme.

It should be noted that the frequency-domain preamble signal mapped to the $n^{th}$ transmit antenna is a signal generated without considering the guard band as shown in FIG. 7.

As is apparent from the foregoing description, the present invention performs channel estimation using the LMS scheme, making it possible to show the similar performance to that of the MMSE scheme and to enable channel estimation with reduced calculation complexity. In addition, the present invention provides a time-domain preamble signal structure for enabling channel estimation for the LMS scheme, so there is no need for the use of the linear interpolation scheme, contributing to an increase in the channel estimation performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a preamble signal in a signal transmission apparatus of an Orthogonal Frequency Division Multiplexing (OFDM) communication system using a Multiple Input Multiple Output (MIMO) scheme, the method comprising:
    if $N_T$ transmit antennas are in use by the signal transmission apparatus, transmitting a time-domain preamble signal via each of the $N_T$ transmit antennas for a corresponding time period during an OFDM symbol period, each corresponding time period corresponding to one of the $N_T$ transmit antennas and set prior to the corresponding time period, wherein transmitting the time-domain preamble signal comprises:
    if the time-domain preamble signal is transmitted via a first transmit antenna among the $N_T$ transmit antennas for the corresponding time period, transmitting a zero signal which has an input value of '0' via the remaining transmit antennas except for the first antenna among the $N_T$ transmit antennas for the corresponding time period.

2. The method of claim 1, wherein each time period corresponding to one of the $N_T$ transmit antennas is a time period associated with a number of samples, the number being equal to a number of time-domain data used to detect a channel impulse response.

3. The method of claim 1, wherein the time-domain preamble signal transmitted via each of the corresponding transmit antennas is a signal generated by performing Inverse Fast Fourier Transform (IFFT) on a frequency-domain preamble signal generated using a block-type scheme.

4. The method of claim 3, wherein the frequency-domain preamble signal includes a guard band subcarrier signal, and the guard band subcarrier signal has only a value of zero.

5. The method of claim 3, wherein the frequency-domain preamble signal includes a guard band subcarrier signal, and is expressed as the following equation:

$$P_n = \begin{bmatrix} 0_{G/2} \\ F_P^H P_n \\ 0_{G/2} \end{bmatrix},$$

where n denotes a transmit antenna index, G denotes a guard band length, P denotes a value obtained by subtracting the G from a number N of points used during the IFFT, $F_P^H$ denotes an IFFT matrix, H denotes Hermitian calculation, $P_n$ denotes a time-domain preamble sequence mapped to an $n^{th}$ transmit antenna, and $0_{G/2}$ denotes a (G/2)×1 zero matrix.

6. An apparatus for transmitting a preamble signal in a signal transmission apparatus of an Orthogonal Frequency Division Multiplexing (OFDM) communication system using a Multiple Input Multiple Output (MIMO) scheme, the apparatus comprising:
    $N^T$ transmission units connected to each of $N^T$ transmit antennas on a one-to-one basis when the $N^T$ transmit antennas are in use by the signal transmission apparatus;
    wherein each of the $N^T$ transmission units is configured to transmit a time-domain preamble signal for a corresponding time period during an OFDM symbol period, each corresponding time period corresponding to one of the $N^T$ transmit antennas and set prior to the corresponding time period,
    wherein if the time-domain preamble signal is transmitted via a first transmit antenna among the $N^T$ transmit antennas, each of the remaining transmission units except for a first transmission unit among the $N^T$ transmission units transmits a zero signal which has an input value of '0' via corresponding transmit antennas for the corresponding time period, the first transmission unit corresponding to the first antenna.

7. The apparatus of claim 6, wherein each time period corresponding to one of the $N_T$ transmit antennas is a time period associated with a number of samples, the number being equal to a number of time-domain data used to detect a channel impulse response.

8. The apparatus of claim 6, wherein the time-domain preamble signal transmitted via each of the corresponding transmit antennas is a signal generated by performing Inverse Fast Fourier Transform (IFFT) on a frequency-domain preamble signal generated using a block-type scheme.

9. The apparatus of claim 8, wherein the frequency-domain preamble signal includes a guard band subcarrier signal, and the guard band subcarrier signal has only a value of zero.

10. The apparatus of claim 8, wherein the frequency-domain preamble signal includes a guard band subcarrier signal, and is expressed as the following equation:

$$P_n = \begin{bmatrix} 0_{G/2} \\ F_P^H P_n \\ 0_{G/2} \end{bmatrix},$$

where n denotes a transmit antenna index, G denotes a guard band length, P denotes a value obtained by subtracting the G from a number N of points used during the IFFT, $F_P^H$ denotes an IFFT matrix, H denotes Hermitian calculation, $P_n$ denotes a time-domain preamble sequence mapped to an $n^{th}$ transmit antenna, and $0_{G/2}$ denotes a (G/2)×1 zero matrix.

11. A method for receiving a preamble signal in a signal reception apparatus of an Orthogonal Frequency Division Multiplexing (OFDM) communication system using a Multiple Input Multiple Output (MIMO) scheme, the method comprising:

if the signal reception apparatus includes $N_R$ reception units which are connected to each of $N_R$ receive antennas, receiving, by a first reception unit among the $N_R$ reception units, a time-domain preamble signal transmitted by a first signal transmission apparatus corresponding to the first reception unit via a first receive antenna connected to the first reception unit, and a zero signal which has an input value of '0' via each of the remaining receive antennas except for the first reception unit among the $N_R$ reception units;

wherein if the signal transmission apparatus uses $N_T$ transmit antennas, the time-domain preamble signal is transmitted by a first antenna corresponding to the first signal transmission apparatus for a corresponding time period set prior during an OFDM symbol period, each time period corresponding to one of the $N_T$ transmit antennas, the first antenna being one of the $N_T$ transmit antennas.

12. The method of claim 11, wherein each time period corresponding to one of the $N_T$ transmit antennas is a time period associated with a number of samples, the number being equal to a number of time-domain data used to detect a channel impulse response.

13. The method of claim 11, wherein the time-domain preamble signal transmitted via each of the corresponding transmit antennas is a signal generated by performing Inverse Fast Fourier Transform (IFFT) on a frequency-domain preamble signal generated using a block-type scheme.

14. The method of claim 13, wherein the frequency-domain preamble signal includes a guard band subcarrier signal, and the guard band subcarrier signal has only a value of zero.

15. The method of claim 13, wherein the frequency-domain preamble signal includes a guard band subcarrier signal, and is expressed as the following equation:

$$P_n = \begin{bmatrix} 0_{G/2} \\ F_P^H P_n \\ 0_{G/2} \end{bmatrix},$$

where n denotes a transmit antenna index, G denotes a guard band length, P denotes a value obtained by subtracting the G from a number N of points used during the IFFT, $F_P^H$ denotes an IFFT matrix, H denotes Hermitian calculation, $P_n$ denotes a time-domain preamble sequence mapped to an $n^{th}$ transmit antenna, and $0_{G/2}$ denotes a (G/2)×1 zero matrix.

16. An apparatus for receiving a preamble signal in a signal reception apparatus of an Orthogonal Frequency Division Multiplexing (OFDM) communication system using a Multiple Input Multiple Output (MIMO) scheme, the apparatus comprising:

$N_R$ reception units connected to each of $N_R$ receive antennas on a one-to-one basis when the $N_R$ receive antennas are in use by the signal reception apparatus;

wherein each of the $N_R$ reception units is configured to receive a time-domain preamble signal transmitted by a first signal transmission apparatus corresponding to the signal reception apparatus, via the corresponding receive antenna, and a zero signal which has an input value of '0' via each of the remaining receive antennas except for the corresponding receive antenna among the $N_R$ receive antennas; and wherein if the signal transmission apparatus uses $N_T$ transmit antennas, the time-domain preamble signal is transmitted by a first antenna corresponding to the first signal transmission apparatus for a corresponding time period set prior during an OFDM symbol period, each time period corresponding to one of the $N_T$ transmit antennas, the first antenna being one of the $N_T$ transmit antennas.

17. The apparatus of claim 16, wherein each time period corresponding to one of the $N_T$ transmit antennas is a time period associated with a number of samples, the number being equal to a number of time-domain data used to detect a channel impulse response.

18. The apparatus of claim 16, wherein the time-domain preamble signal transmitted via each of the corresponding transmit antennas is a signal generated by performing Inverse Fast Fourier Transform (IFFT) on a frequency-domain preamble signal generated using a block-type scheme.

19. The apparatus of claim 18, wherein the frequency-domain preamble signal includes a guard band subcarrier signal, and the guard band subcarrier signal has only a value of zero.

20. The apparatus of claim 18, wherein the frequency-domain preamble signal includes a guard band subcarrier signal, and is expressed as the following equation:

$$P_n = \begin{bmatrix} 0_{G/2} \\ F_P^H P_n \\ 0_{G/2} \end{bmatrix},$$

where n denotes a transmit antenna index, G denotes a guard band length, P denotes a value obtained by subtracting the G from a number N of points used during the IFFT, $F_P^H$ denotes an IFFT matrix, H denotes Hermitian calculation, $P_n$ denotes a time-domain preamble sequence mapped to an $n^{th}$ transmit antenna, and $0_{G/2}$ denotes a (G/2)×1 zero (0) matrix.

21. A method for estimating a channel in a signal reception apparatus of an Orthogonal Frequency Division Multiplexing (OFDM) communication system using a Multiple Input, Multiple Output (MIMO) scheme, the method comprising:

if the signal reception apparatus uses $N_R$ receive antennas that include $N_R$ reception units, receiving, by a first reception unit, a time-domain preamble signal transmitted by a first signal transmission apparatus corresponding to the first reception unit, via a first receive antenna connected to the first reception unit, and a zero signal which has an input value of '0' via each of the remaining receive antennas except for the first reception unit among the $N_R$ reception units; and estimating a channel according to a channel estimation scheme using a time-domain preamble signal received via each of the $N_R$ receive antennas;

wherein if the signal transmission apparatus uses $N_T$ transmit antennas, the time-domain preamble signal is transmitted by a first antenna corresponding to the first signal transmission apparatus for a corresponding time period set prior during an OFDM symbol period, each time period corresponding to one of the $N_T$ transmit antennas, the first antenna being one of the $N_T$ transmit antennas.

22. The method of claim 21, wherein each time period corresponding to one of the $N_T$ transmit antennas is a time period associated with a number of samples, the number being equal to a number of time-domain data used to detect a channel impulse response.

23. The method of claim 21, wherein the time-domain preamble signal transmitted via each of the corresponding transmit antennas is a signal generated by performing Inverse Fast Fourier Transform (IFFT) on a frequency-domain preamble signal generated using a block-type scheme.

24. The method of claim 23, wherein the frequency-domain preamble signal includes a guard band subcarrier signal, and the guard band subcarrier signal has only a value of zero.

25. The method of claim 23, wherein the frequency-domain preamble signal includes a guard band subcarrier signal, and is expressed as the following equation:

$$P_n = \begin{bmatrix} 0_{G/2} \\ F_P^H \underline{P}_n \\ 0_{G/2} \end{bmatrix},$$

where n denotes a transmit antenna index, G denotes a guard band length, P denotes a value obtained by subtracting the G from a number N of points used during the IFFT, $F_P^H$ denotes an IFFT matrix, H denotes Hermitian calculation, $\underline{P}_n$ denotes a time-domain preamble sequence mapped to an $n^{th}$ transmit antenna, and $0_{G/2}$ denotes a (G/2)×1 zero (0) matrix.

26. The method of claim 21, wherein the estimating a channel comprises:
estimating a channel according to the channel estimation scheme defined as the following equation:

$$\underline{u}^{(n,j)}(k) = \hat{\underline{h}}^{(n,j)H}(k)\underline{x}^{(n)}(k),$$

where n denotes a transmit antenna index, j denotes a receive antenna index, H denotes Hermitian calculation, L denotes a number of taps, k denotes a time index, $x^{(n)}(k)$ denotes a time-domain preamble signal transmitted via an $n^{th}$ transmit antenna at a time k, $\hat{h}^{(n,j)}(k)=[\hat{\underline{h}}_L^{(n,j)}(k), \ldots, \hat{\underline{h}}_1^{(n,j)}(k)]^T$ denotes an $(n,j)^{th}$ estimated tap vector, and an equation for adapting the $\hat{\underline{h}}^{(n,j)}(k)$ is expressed as:

$$\hat{\underline{h}}^{(n,j)}(k+1) = \hat{\underline{h}}^{(n,j)}(k) + 2\mu \underline{x}^{(n)}(k)\underline{e}^{(n,j)*}(k)$$

where μ denotes a step-size parameter for controlling a convergence speed of the above equation, * denotes complex conjugation, and an estimated time-domain error signal $\underline{e}^{(n,j)}(k)$ is expressed as:

$$\underline{e}^{(n,j)}(k) = \underline{y}^{(j)}(k) - \underline{u}^{(n,j)}(k)$$

where $y^{(j)}(k)$ denotes a time-domain preamble signal received via a $j^{th}$ receive antenna at a time k.

27. An apparatus for estimating a channel in a signal reception apparatus of an Orthogonal Frequency Division Multiplexing (OFDM) communication system using a Multiple Input Multiple Output (MIMO) scheme, the apparatus comprising:
$N_R$ reception units connected to each of $N_R$ receive antennas on a one-to-one basis when the signal reception apparatus uses the $N_R$ receive antennas;
wherein each of the $N_R$ reception units is configured to receive a time-domain preamble signal transmitted by a first signal transmission apparatus corresponding to the signal reception apparatus, via the corresponding receive antenna, and a zero signal which has an input value of '0' via each of the remaining receive antennas except for the corresponding receive antenna among the $N_R$ receive antennas; and
a channel estimation unit configured to estimate a channel according to a channel estimation scheme using a time-domain preamble signal received via each of the $N_R$ receive antennas;
wherein if the signal transmission apparatus uses $N_T$ transmit antennas, the time-domain preamble signal is transmitted by a first antenna corresponding to the first signal transmission apparatus for a corresponding time period set prior during an OFDM symbol period, each time period corresponding to one of the $N_T$ transmit antennas, the first antenna being one of the $N_T$ transmit antennas.

28. The apparatus of claim 27, wherein each time period corresponding to one of the $N_T$ transmit antennas is a time period associated with a number of samples, the number being equal to a number of time-domain data used to detect a channel impulse response.

29. The apparatus of claim 27, wherein the time-domain preamble signal transmitted via each of the corresponding transmit antennas is a signal generated by performing Inverse Fast Fourier Transform (IFFT) on a frequency-domain preamble signal generated using a block-type scheme.

30. The apparatus of claim 29, wherein the frequency-domain preamble signal includes a guard band subcarrier signal, and the guard band subcarrier signal has only a value of zero.

31. The apparatus of claim 29, wherein the frequency-domain preamble signal includes a guard band subcarrier signal, and is expressed as the following equation:

$$P_n = \begin{bmatrix} 0_{G/2} \\ F_P^H \underline{P}_n \\ 0_{G/2} \end{bmatrix},$$

where n denotes a transmit antenna index, G denotes a guard band length, P denotes a value obtained by subtracting the G from a number N of points used during the IFFT, $F_P^H$ denotes an IFFT matrix, H denotes Hermitian calculation, $\underline{P}_n$ denotes a time-domain preamble sequence mapped to an $n^{th}$ transmit antenna, and $0_{G/2}$ denotes a (G/2)×1 zero (0) matrix.

32. The apparatus of claim 27, wherein the channel estimation unit estimates a channel according to the channel estimation scheme defined as the following equation:

$$\underline{u}^{(n,j)}(k) = \hat{\underline{h}}^{(n,j)H}(k)\underline{x}^{(n)}(k),$$

where n denotes a transmit antenna index, j denotes a receive antenna index, H denotes Hermitian calculation, L denotes a number of taps, k denotes a time index, $x^{(n)}(k)$ denotes a time-domain preamble signal transmitted via an $n^{th}$ transmit antenna at a time k, $\hat{h}^{(n,j)}(k)=[\hat{\underline{h}}_L^{(n,j)}(k), \ldots, \hat{\underline{h}}_1^{(n,j)}(k)]^T$ denotes an $(n,j)^{th}$ estimated tap vector, and an equation for adapting the $\hat{\underline{h}}^{(n,j)}(k)$ is expressed as:

$$\hat{\underline{h}}^{(n,j)}(k+1) = \hat{\underline{h}}^{(n,j)}(k) + 2\mu \underline{x}^{(n)}(k)\underline{e}^{(n,j)*}(k),$$

where μ denotes a step-size parameter for controlling a convergence speed of the above equation, * denotes complex conjugation, and an estimated time-domain error signal $\underline{e}^{(n,j)}(k)$ is expressed as:

$$\underline{e}^{(n,j)}(k) = \underline{y}^{(j)}(k) - \underline{u}^{(n,j)}(k),$$

where $y^{(j)}(k)$ denotes a time-domain preamble signal received via a $j^{th}$ receive antenna at a time k.

* * * * *